J. A. KEISTER.
VALVE.
APPLICATION FILED APR. 5, 1917.

1,249,112.

Patented Dec. 4, 1917.

John A. Keister,
Inventor
By Hugh K. Wagner,
Attorney

UNITED STATES PATENT OFFICE.

JOHN A. KEISTER, OF ST. LOUIS, MISSOURI.

VALVE.

1,249,112.   Specification of Letters Patent.   Patented Dec. 4, 1917.

Application filed April 5, 1917. Serial No. 160,002.

*To all whom it may concern:*

Be it known that I, JOHN A. KEISTER, a citizen of the United States, residing at the city of St. Louis, in the State of Missouri, have invented certain new and useful Improvements in Valves, of which the following is a specification.

This invention consists of a simplified and cheapened structure that will operate with greater certainty and that will permit the introduction or release therethrough more rapidly than other valves of fluid under pressure, as, for instance, air in a tire for a motor-vehicle or the like. Devices embodying the present invention will effectually prevent leakage, and can be applied to, or removed from, any standard valve-stem with great ease. It can be used in combination with devices of various kinds, some of which are now standard or staple in connection with automobile tires, and to which it is adapted to fit in screw-threaded connection without change in the said standard parts.

In the accompanying drawings forming part of this specification and in which like numbers of reference denote like parts wherever they occur, Figure 1 is a fragmentary side elevation of an automobile tire, showing the usual valve-stem protruding therefrom, with this valve (in section) mounted on the outer end of the said stem;

From the tire 1 (of any ordinary or desired construction), or any chamber, protrudes the usual hollow valve-stem 2, which is exteriorly threaded at 3 for reception of the interiorly screw-threaded body 4 of this invention.

The end of the body 4 away from the stem 2 is reduced in diameter and exteriorly screw-threaded at 5 to receive the interiorly threaded cap 6.

The body 4 is hollow, for the passage of air or other fluid, for the introduction of which into the interior of the tire 1 or other container the cap 6 must first be removed.

Figure 2:
Fig. 2 is a side elevation of this valve and its inclosing cap.
Figure 1:
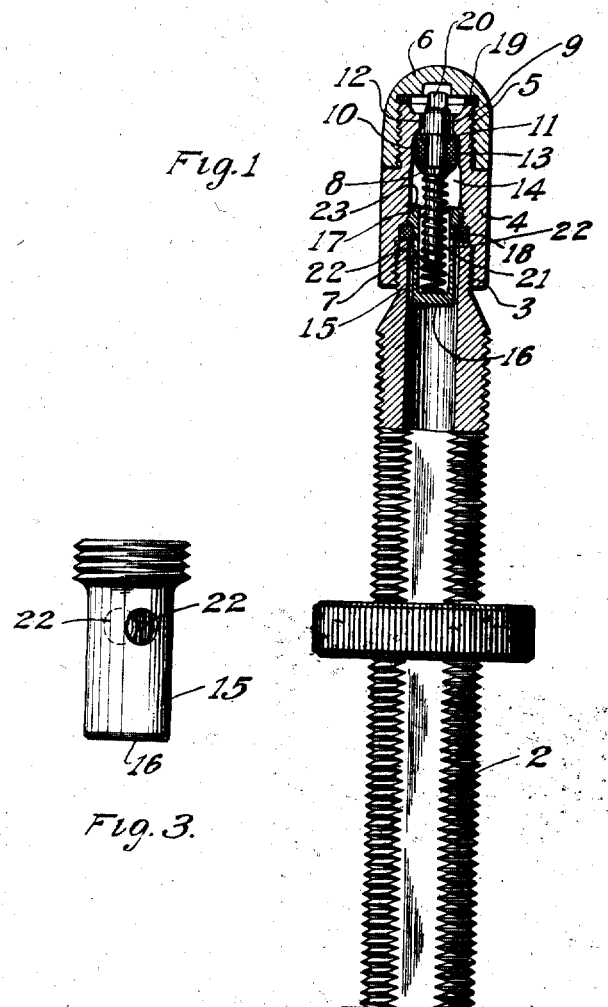
Figure 3:
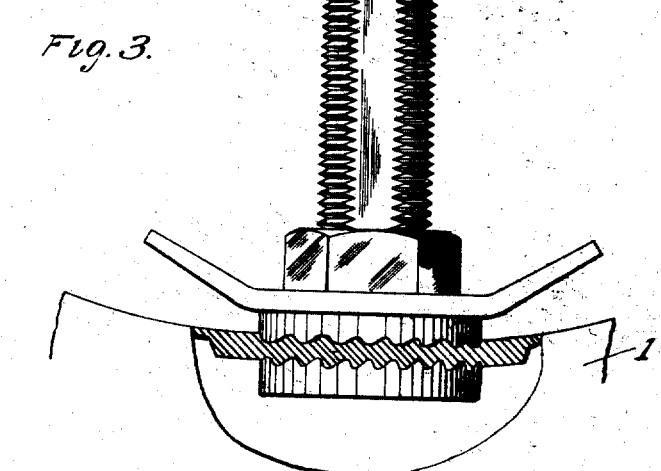
Fig. 3 is a detail on an enlarged scale showing the valve-cup and openings thereout.

Within the passage through the body 4 is located the valve-stem 7 bearing the valve collar 8, between which and the shoulder 9 is located, held, and borne the resilient collar or gasket 10, which seats as a valve on the valve-seat 11. The resilient collar or gasket 10 preferably impinges at an angular corner thereof about midway between the edges of the valve-seat 11, and the said valve-seat is preferably at an angle of about sixty degrees to the horizontal. By arrangement at the said angle and by the said arrangement whereby the angular end of the gasket 10 bears at the point stated on the said valve-seat, a beneficial result is obtained by reason of the gasket 10 being thus allowed to spread into the tightest and most complete engagement with the valve-seat 11. The said gasket 10 is firmly held in place by the valve collar 8 of approximately the same diameter, and at its other end is prevented from easy longitudinal movement by the shoulder 9, preferably of less diameter than the gasket 10. Anterior to the valve-seat 11 is the straight part 12 of the passage through the body 4, and posterior to the valve-seat 11 is another straight part 13 of the said passage, which straight part opens into the enlarged chamber 14, which communicates with the interior of the valve-cup 15, against the bottom 16 of which cup the posterior end of the valve-stem 7 strikes when the valve or gasket 10 is pushed far inwardly as, for instance, under a heavy pressure of air. The valve-cup 15 is threaded at 17 to coöperate with threads within the passage through body 4. The threaded connection at 3 and the lead gasket 18 prevent leakage of air from the valve to the outside. It will be understood that when the body 4 is screwed home upon the stem 2, the gasket 18 is upset or mashed so as to spread and fill crevices. The said gasket may be made of any suitable soft or relatively soft material. Cap 6, containing gasket 10 of soft or relatively soft material, excludes dust and moisture from the outside and precludes the escape of air. The cap 6 and the body 4 are diamond-knurled, as shown in Fig. 2, for convenience of manipulation with the fingers.

It will be observed that the nose 20 of the stem 7 is of less diameter than the passage 12 and that the collar or gasket 10 is of less diameter than the passage 13, thus allowing for the free entrance of air to chamber 14, and that the interior of cup 15 is of larger diameter than the valve-stem 7 encircled by spring 21. The air that is forced into cup 15 freely passes through openings 22 into the hollow interior of stem 2 and thence to tire 1.

Furthermore, it will be observed that spring 21 impinges upon the bottom 16 of cup 15 and at its other end abuts collar 8, and that the said spring is longer than valve-stem 7, by which it results that if sufficient air-pressure is applied to the exterior of the valve to force it strongly in the backward direction against the pressure of spring 21, it can not be forced any farther than to a point where valve-stem 7 strikes the bottom 16 of cup 15. This not only prevents the wearing out of spring 21 by undue compression, but also prevents the possibility of collar 8 being pressed so far inward as to seat upon shoulder 23.

In practice it has been found that this construction, with the permitted wide opening at valve-seat 11 by the thrusting away therefrom of the gasket 10, allows much more rapid inflation of a tire than with valves heretofore commonly in use. Motorists frequently find it necessary, also, to deflate tires, and in so doing must either tediously hold pressure upon a valve to keep it open until all the air has escaped or with difficulty remove the "center" of the valve. In the use of the present invention, however, this can be accomplished in the quickest and easiest manner possible by unscrewing the body 4 from the stem 2, which allows all the air rapidly to exhaust through stem 2. The small valve parts are not disturbed when body 4 is thus removed, because they are taken off with it even while cap 6 remains in place.

This shows, also, the facility with which these valves as a whole may be applied to any ordinary stem not having a valve in it, as such parts are made of standard sizes, and these valves are applied by merely screwing body 4 upon stem 2.

The wearing out of a spring like spring 21 by undue pressure (which undue pressure is prevented by the check construction provided by the construction herein shown and described) renders a valve inefficient, as it allows bubbling of air through the valve and makes it unable to hold air under light pressure, as when tires have been partially inflated for shipment.

Having thus described this invention, I hereby reserve the benefit of all changes in form, arrangement, order, or use of parts, as it is evident that many minor changes may be made therein without departing from the spirit of this invention.

I claim:

1. A tubular member internally threaded at its lower end for engagement with the usual valve stem of a tire, a cup having a closed bottom threaded into said tubular member above the lower end thereof, the body portion of said cup lying in spaced relation to the interior of said tubular member to thereby provide an annular space therearound and having an opening in its side which establishes communication between the interior of the cup and the annular space, a compressible gasket in said annular space between the cup and the tubular member adapted to form an airtight joint between the top of the valve stem and the tubular member when the tubular member is screwed upon the valve stem, a valve seat formed upon the tubular member outwardly of the cup, a valve coacting therewith, a spring seated upon the bottom of the cup and acting against said valve, and means carried by the valve for engaging the bottom of the cup, the length of said means being so proportioned to the depth of the cup that the said means engages the bottom of the cup before the spring is closed.

2. A tubular member internally threaded at its lower end for engagement with the usual valve stem of a tire, a cup having a closed bottom threaded into said tubular member above the lower end thereof, the body portion of said cup lying in spaced relation to the interior of said tubular member to thereby provide an annular space therearound, a compressible gasket in said annular space between the cup and the tubular member adapted to form an air tight joint between the top of the valve stem and the tubular member when the tubular member is screwed upon the valve stem, said cup having lateral openings formed in its wall which establish communication between the interior of the cup and the space between the cup and the tubular member, a valve seat formed upon the tubular member outwardly of the cup, a valve coacting therewith, a central stem depending from the valve, a spring encircling said stem and bearing between the valve and the bottom of the cup, the length of said stem being so proportioned to the depth of the cup that the said stem engages the bottom of the cup before the spring is closed.

In testimony whereof I hereunto affix my signature.

JOHN A. KEISTER.